(12) United States Patent
Yuan (10) Patent No.: US 7,150,440 B2
(45) Date of Patent: Dec. 19, 2006

(54) ADJUSTABLE SUPPORT FRAME FOR A DISPLAY SCREEN

(75) Inventor: Min-Hao Yuan, Miao Li County (TW)

(73) Assignee: Coretronic Corporation, Miao Li County (TW)

( * ) Notice: Subject to any disclaimer, the term of this patent is extended or adjusted under 35 U.S.C. 154(b) by 0 days.

(21) Appl. No.: 11/199,969

(22) Filed: Aug. 9, 2005

(65) Prior Publication Data

US 2006/0138298 A1 Jun. 29, 2006

(30) Foreign Application Priority Data

Dec. 23, 2004 (TW) .............................. 93140262 A (51) Int. Cl.
*A47G 29/00* (2006.01)
(52) U.S. Cl. .................. 248/372.1; 248/121; 248/371; 248/397; 248/917; 248/923
(58) Field of Classification Search ........ 248/917–924, 248/372.1, 371, 121, 397, 454, 455, 463, 248/465
See application file for complete search history.

(56) References Cited

U.S. PATENT DOCUMENTS

| 5,758,849 | A | * | 6/1998 | Bui et al. ................. 248/125.1 |
| 5,831,696 | A | * | 11/1998 | Sheng .......................... 349/58 |
| 5,915,658 | A | * | 6/1999 | Sheng ................... 248/346.06 |
| 6,766,994 | B1 | * | 7/2004 | Serbinski et al. ........... 248/371 |
| 6,975,507 | B1 | * | 12/2005 | Wang et al. ................. 361/683 |
| 7,068,497 | B1 | * | 6/2006 | Chu ........................... 361/681 |
| 2005/0139740 | A1 | * | 6/2005 | Chen et al. .............. 248/286.1 |
| 2005/0253040 | A1 | * | 11/2005 | Yang .......................... 248/688 |

* cited by examiner

*Primary Examiner*—Amy J. Sterling
(74) *Attorney, Agent, or Firm*—Ladas & Parry LLP (57) ABSTRACT

An adjustable support frame for a display screen includes a frame base, a bottom-supporting strut unit, a back-supporting strut unit and an adjusting unit. The bottom-supporting strut unit is connected fixedly to the frame base, and is connected pivotally to a screen bottom of the screen. The back-supporting strut unit includes a connecting member and a supporting member connected pivotally to both the base and the connecting member. The adjusting unit includes a driving member movable on the mounting plate between a locking position and a release position. In the locking position, a second engaging member engages a first engaging member so as to lock the connecting member on a screen back of the screen. In the release position, the second engaging member is removed from the first engaging member so as to release the connecting member from the screen back.

11 Claims, 10 Drawing Sheets

ADJUSTABLE SUPPORT FRAME FOR A DISPLAY SCREEN

CROSS-REFERENCE TO RELATED APPLICATION

This application claims priority of Taiwanese Application No. 093140262, filed on Dec. 23, 2004.

BACKGROUND OF THE INVENTION

1. Field of the Invention

This invention relates to an adjustable support frame, and more particularly to an adjustable support frame for a display screen.

2. Description of the Related Art

Figure 1:
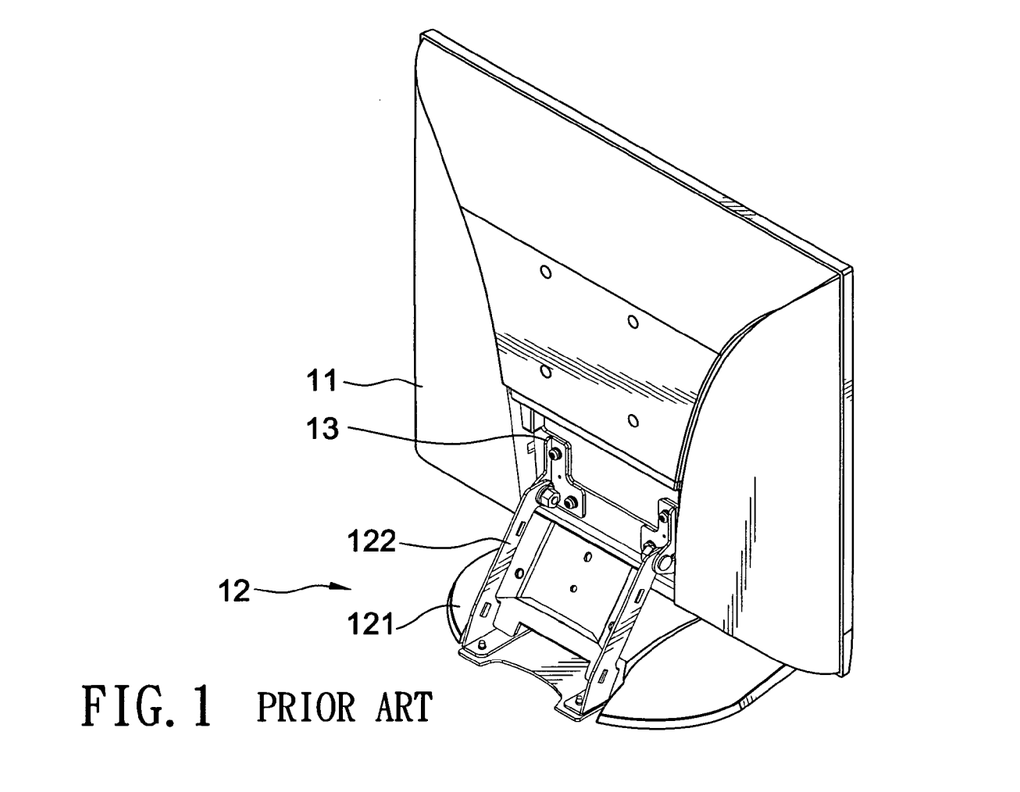
FIG. 1 is a perspective view of a conventional support frame for a display screen.
Figure 2:
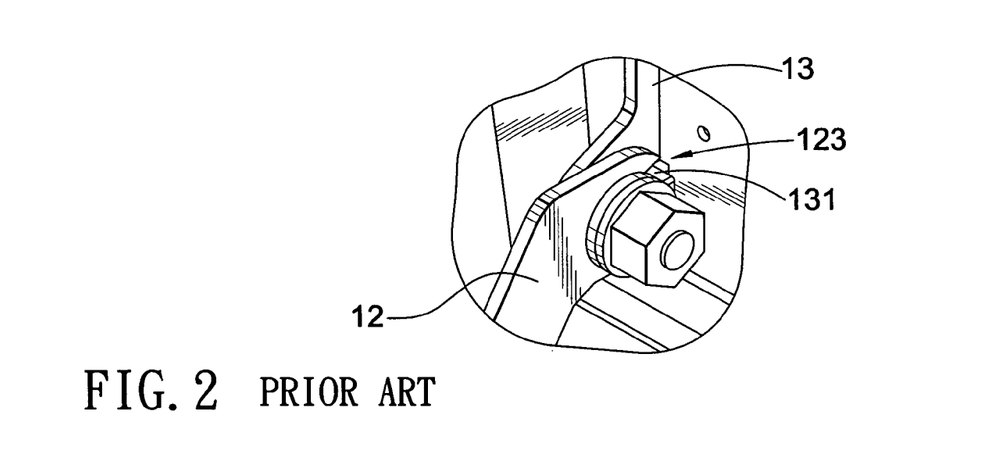
FIG. 2 is a fragmentary perspective view of the conventional support frame, illustrating a connection between a supporting member and a connecting member.

Referring to FIGS. 1 and 2, a conventional support frame 12 supports a display screen 11, such as a liquid crystal display, on a working surface of a desk (not shown). The support frame 12 includes a base 121 and a supporting member 122. The supporting member 122 has a lower end connected fixedly to the base 121, and an upper end connected pivotally to a connecting member 13 that is disposed fixedly on the display screen 11. The upper end of the supporting member 122 is formed with two U-shaped connecting portions, each of which defines a gap 123. The connecting member 13 is formed with two positioning tongues 131 that extend toward each other and that are inserted respectively into the gaps 123. As such, the aforesaid conventional support frame 12 suffers from the following disadvantages:

(1) The angle of the display screen 11 can be adjusted only by an amount that is determined by the size of the gaps 123.

(2) When a signal is inputted into the display screen 11 by use of a stylus or finger (assuming the display screen 11 is provided with touchscreen capabilities), the display screen 11 may rotate relative to the supporting member 12.

SUMMARY OF THE INVENTION

The object of this invention is to provide an adjustable support frame for a display screen that can overcome the aforesaid disadvantages associated with the prior art.

According to this invention, an adjustable support frame for a display screen includes a frame base, a bottom-supporting strut unit, a back-supporting strut unit and an adjusting unit. The bottom-supporting strut unit is connected fixedly to the frame base, and is connected pivotally to a screen bottom of the screen. The back-supporting strut unit includes a connecting member and a supporting member connected pivotally to both the frame base and the connecting member. The adjusting unit includes a driving member movable on the mounting plate between a locking position and a release position. In the locking position, a second engaging member engages a first engaging member so as to lock the connecting member on a screen back of the screen. In the release position, the second engaging member is removed from the first engaging member so as to release the connecting member from the screen back.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 3:
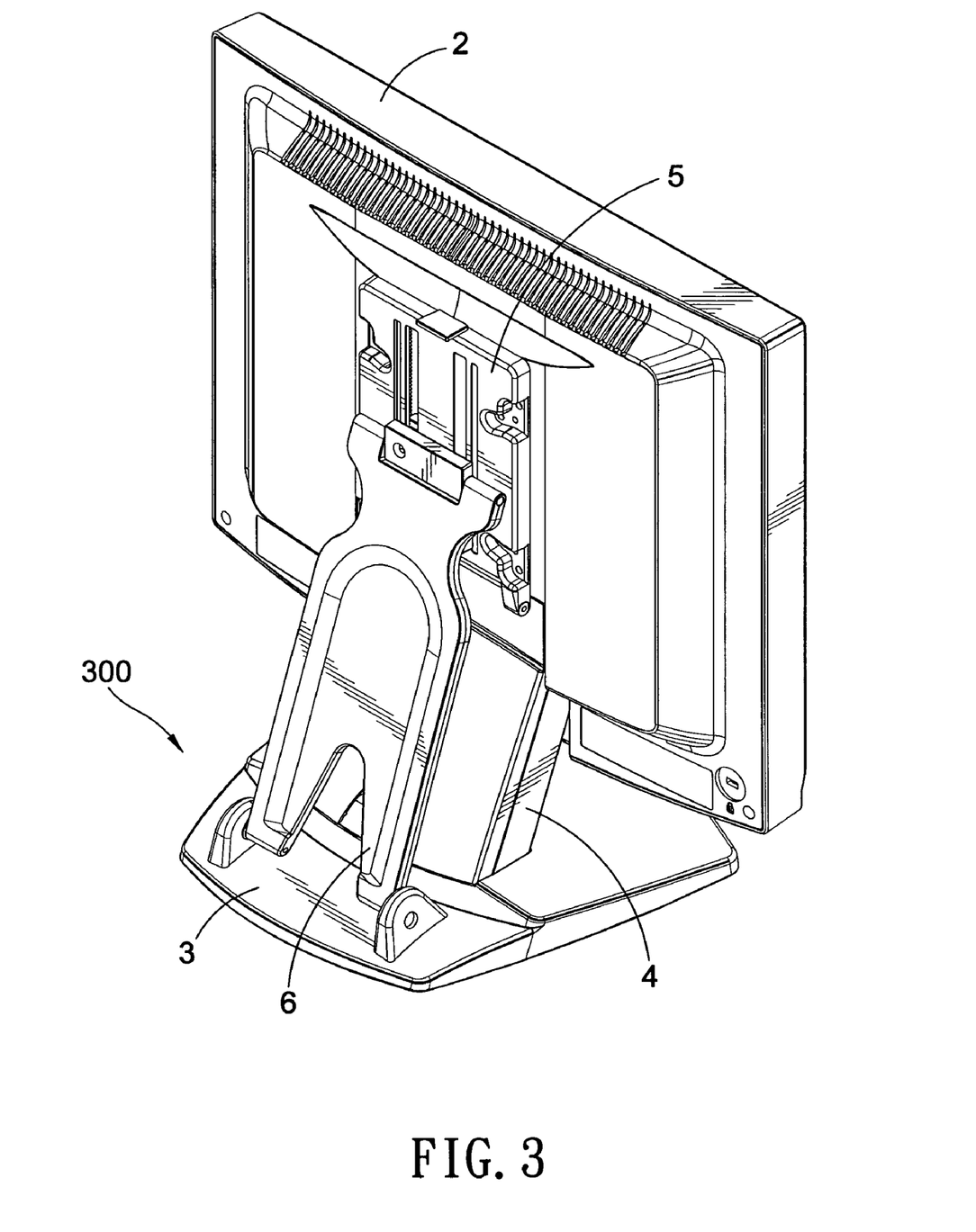
FIG. 3 is an assembled perspective view of the first preferred embodiment of an adjustable support frame for a display screen according to this invention.
Figure 4:
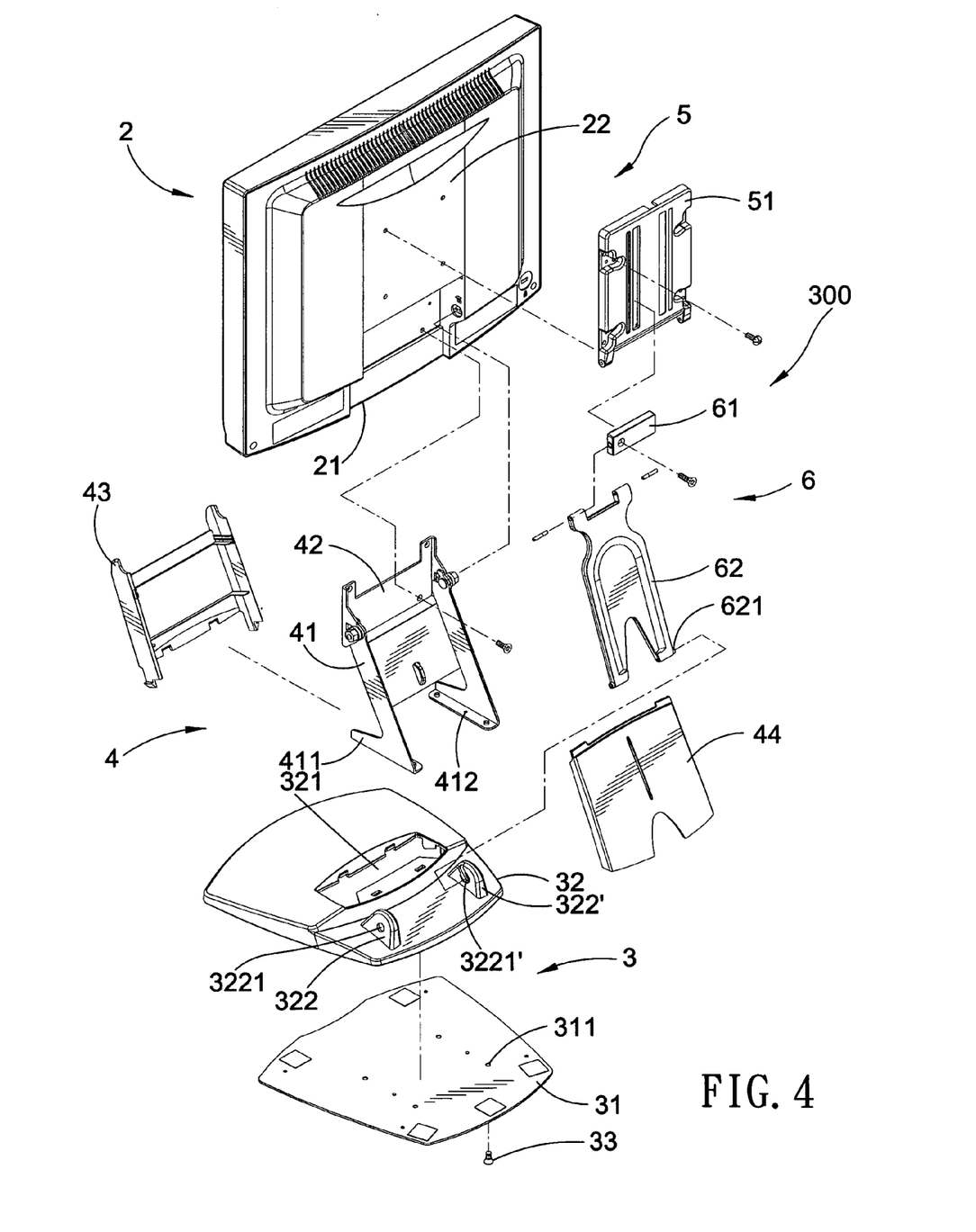
FIG. 4 is a fragmentary exploded perspective view of the first preferred embodiment.

Referring to FIGS. 3 and 4, the first preferred embodiment of a support frame 300 for supporting a display screen 2 on a supporting surface 400 (see FIG. 8) includes a frame base 3, a bottom-supporting strut unit 4, an adjusting unit 5 and a back-supporting strut unit 6. The display screen 2 may be a liquid crystal display, and has a screen bottom 21 and a screen back 22. The supporting surface 400 may be a working surface of a desk.

The frame base 3 is disposed on the supporting surface 400, and includes a bottom plate 31 and a top cover 32. The top cover 32 is connected removably to the bottom plate 31, and has a hole 321 formed therethrough, and a pair of aligned first and second lugs 322, 322' extending upwardly therefrom. The first lug 322 is formed with a pivot hole 3221 therethrough. The second lug 322' has a side surface that faces the first lug 322 and that is formed with an open-ended and inclined slot 3221'.

The bottom-supporting strut unit 4 includes a supporting member 41, and two outer covers 43, 44 covering respectively two opposite sides of the supporting member 41 for esthetic purposes. The supporting member 41 extends through the hole 321 in the top cover 32, and has two integral feet 411. Bolts 33 (only one is shown in FIG. 4)

extend respectively through holes 311 in the bottom plate 31, and engage respectively threaded holes 412 in the feet 411. Thus, the supporting member 41 is connected fixedly to the frame base 3 at a lower end thereof. The connecting member 42 is connected fixedly to the screen bottom 21, and is connected pivotally to an upper end of the supporting member 41. Therefore, the display screen 2 can rotate relative to the supporting member 41.

Figure 5:
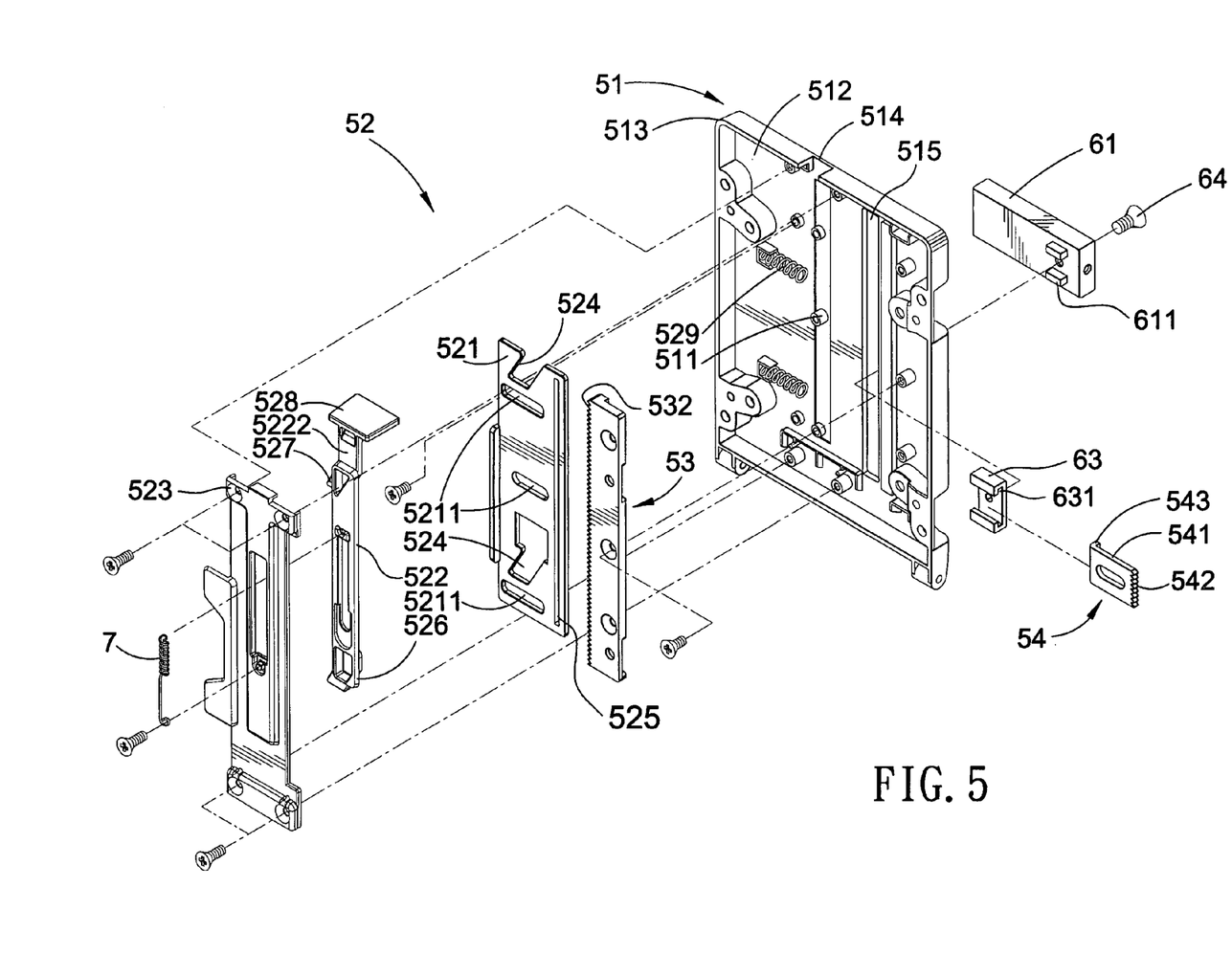
FIG. 5 is an exploded perspective view of a connecting member and an adjusting unit of the first preferred embodiment.

The back-supporting strut unit 6 includes a connecting member 61, a supporting member 62 connected pivotally to the connecting member 61 at an upper end thereof, and a stop member 63 (see FIG. 5). The supporting member 62 is formed with two integral pivot pins 621 that engage respectively the pivot hole 3221 in the first lug 322 and the slot 3221' in the second lug 322'. Thus, the supporting member 62 is connected pivotally to the frame base 3 at a lower end thereof.

Figure 6:
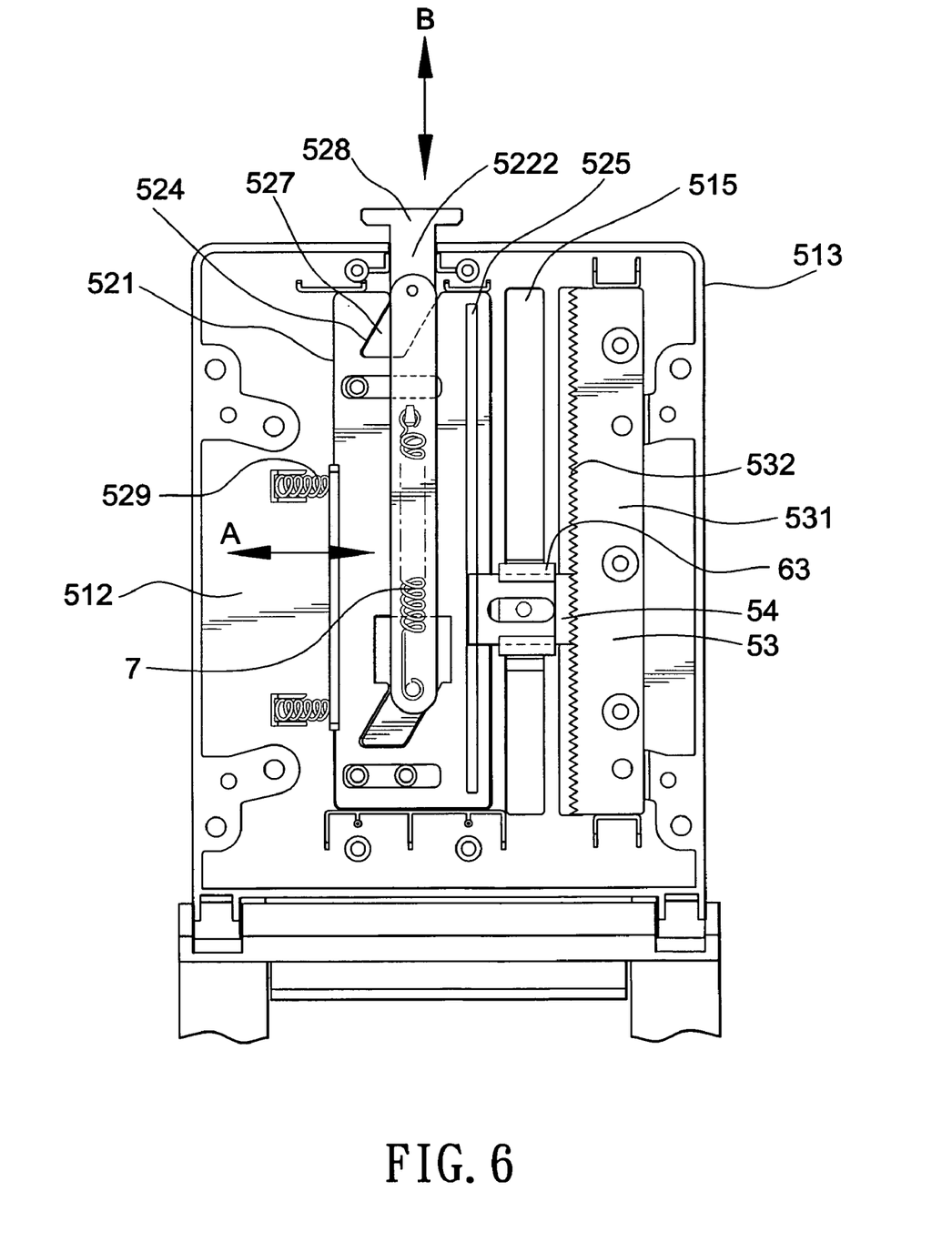
FIG. 6 is a schematic rear view of the adjusting unit of the first preferred embodiment, illustrating a locking position of a driving member.

Referring to FIGS. 4, 5 and 6, the adjusting unit 5 includes a housing 51, a controlling device 52, a first engaging member 53 and a second engaging member 54. The housing 51 is attached fixedly to the screen back 22, and includes a mounting plate 512 and a surrounding wall 513. The surrounding wall 513 is formed along a periphery of a front side surface of the mounting plate 512, and has a notch 514. The mounting plate 512 is formed with a slide slot 515. The connecting member 61 has a front side surface that abuts against a rear side surface of the mounting plate 512 and that is formed with a fixed guiding projection unit. The guiding projection unit includes two parallel ribs 611 that are spaced apart from each other and that extend through the slide slot 515 in the mounting plate 512. The stop member 63 abuts against the front side surface of the mounting plate 512, and is connected fixedly to the connecting member 61 by a bolt 64. This prevents removal of the connecting member 61 from the mounting plate 512, and allows for movement of the connecting member 61 on the mounting plate 512. As such, the connecting member 61 is movable along the slide slot 515 so as to adjust the angle of the display screen 2.

The controlling device 52 includes a sliding plate 521, a driving member 522 and a cover plate 523 that is connected fixedly to the mounting plate 512 so as to conceal a lower portion of the driving member 522 between the mounting plate 512 and the cover plate 523. The sliding plate 521 is formed with three parallel guide slots 5211 extending along a first direction (A) (see FIG. 6). The mounting plate 512 is formed with three guide stubs 511 that are received respectively within the parallel guide slots 5211 in the sliding plate 521. Thus, the sliding plate 521 is guided to move on the mounting plate 512 along the first direction (A). The sliding plate 521 further has two inclined guide slots 524 and a retaining slot 525 that extends along a second direction (B) (see FIG. 6), which is perpendicular to the first direction (A). The inclined guide slots 524 extend along a direction inclined relative to the first and second directions (A, B), and are aligned with each other along the second direction (B). The driving member 522 has a body 526 and two inclined guiding arms 527 that project forwardly from the body 526 and that are parallel to the inclined guide slots 524. The guiding arms 527 are movable respectively within the inclined guide slots 524. The driving member 522 further has a neck portion 5222 and an end plate 528 that are formed integrally with each other. The neck portion 5222 extends through the notch 514 so as to guide the driving member 522 to move on the mounting plate 512 along the second direction (B). The end plate 528 is perpendicular to the mounting plate 512, and is disposed outwardly of the mounting plate 512 to allow for operation by a user. A spring unit includes two coiled compression springs 529 for biasing the sliding plate 521 to move toward the stop member 63 in the first direction (A). As such, when the end plate 528 is operated to move the driving member 522 on the mounting plate 512 along the second direction (B), the sliding plate 521 moves on the mounting plate 512 along the first direction (A).

The first engaging member 53 is disposed fixedly on the mounting plate 512, and is formed with a serrated edge 532. The second engaging member 54 is disposed between the sliding plate 521 and the first engaging member 53, and has an annular plate body 541. The bolt 64 extends through the stop member 63 and the plate body 541 so as to prevent removal of the second engaging member 54 from the stop member 63. The plate body 541 is received slidably within a dovetail groove 631 in the stop member 63, and is formed with a serrated edge 542 at one end thereof, and an insert arm 543 extending perpendicularly from the plate body 541 at the other end thereof. The insert arm 543 is inserted into the retaining slot 525 in the sliding plate 521 so as to allow for synchronous movement of the second engaging member 54 and the sliding plate 521. As a result, the serrated edge 542 of the second engaging member 54 is biased by the compression springs 529 to engage the serrated edge 532 of the first engaging member 53.

Figure 7:
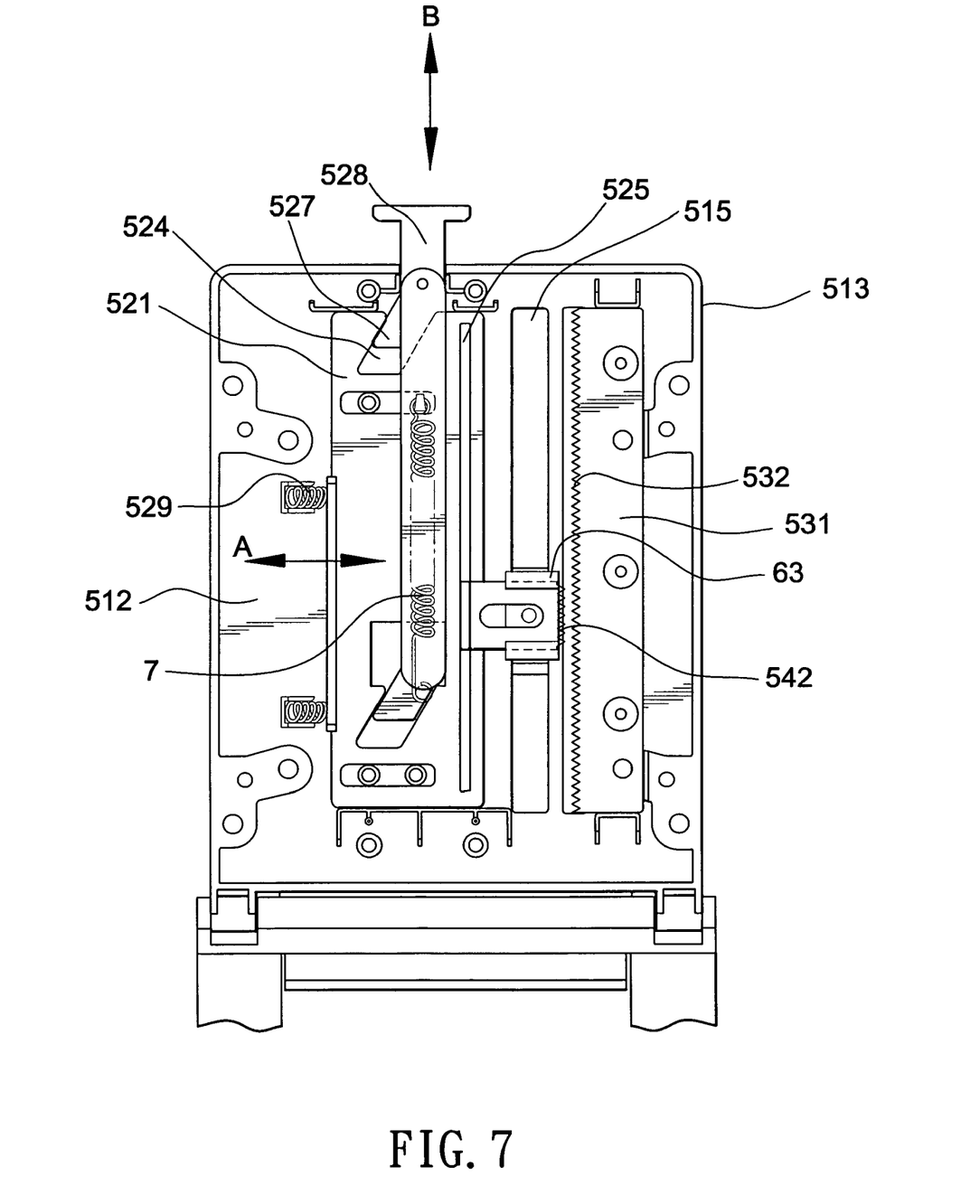
FIG. 7 is a schematic rear view of the adjusting unit of the first preferred embodiment, illustrating a release position of the driving member.
Figure 8:
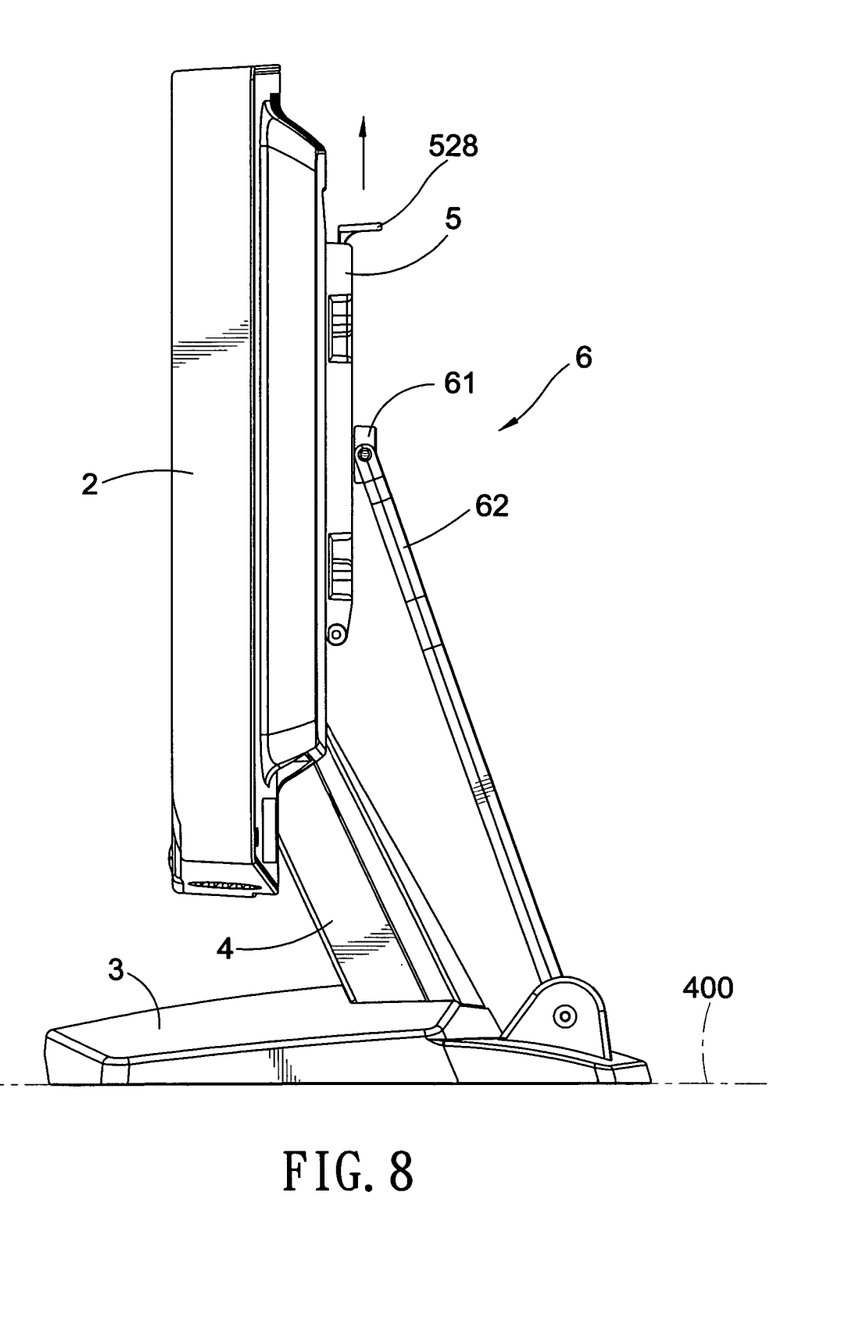
FIG. 8 is a side view of the first preferred embodiment and the display screen, illustrating how the driving member is disposed at the locking position so as to prevent angle adjustment of the display screen.
Figure 9:
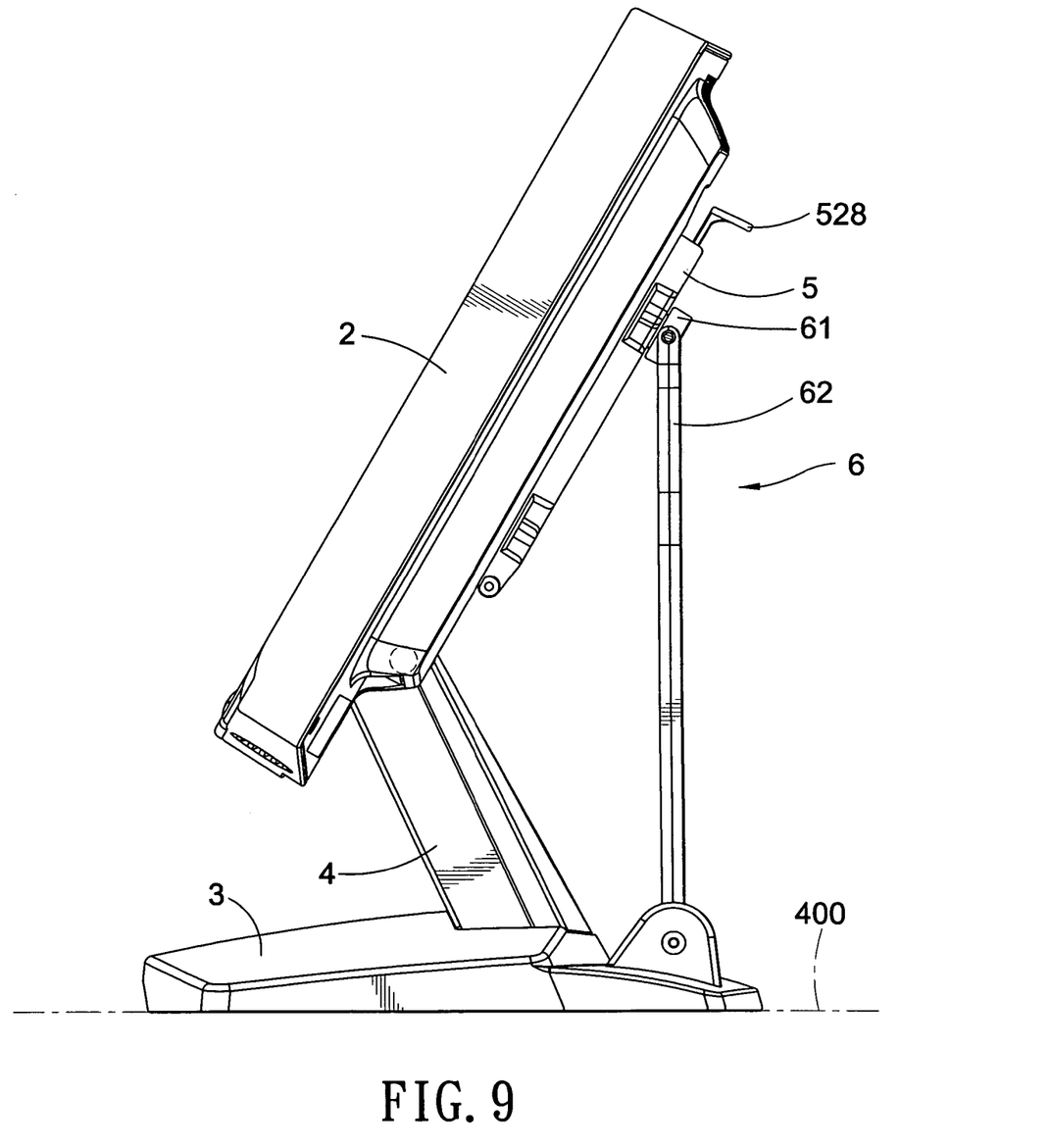
FIG. 9 is a side view of the first preferred embodiment and the display screen, illustrating how the driving member is moved to the release position so as to allow for angle adjustment of the display screen.

The driving member 522 is movable on the mounting plate 512 between a locking position shown in FIGS. 6 and 8 and a release position shown in FIGS. 7 and 9. In the locking position, the second engaging member 54 engages the first engaging member 53 so as to lock the connecting member 61 on the mounting plate 512. This prevents angle adjustment of the display screen 2. In the release position, the second engaging member 54 is removed from the first engaging member 53 so as to release the connecting member 61 from the mounting plate 512. This allows for angle adjustment of the display screen 2. A biasing unit 7 is configured as a coiled tension spring, and connects the driving member 522 to the mounting plate 512 so as to bias the driving member 522 to the locking position.

In operation, when the driving member 522 is pulled upwardly to the release position, the angle of the display screen 2 can be adjusted. After adjustment, the driving member 522 is released, and therefore is biased to the locking position.

Figure 10:
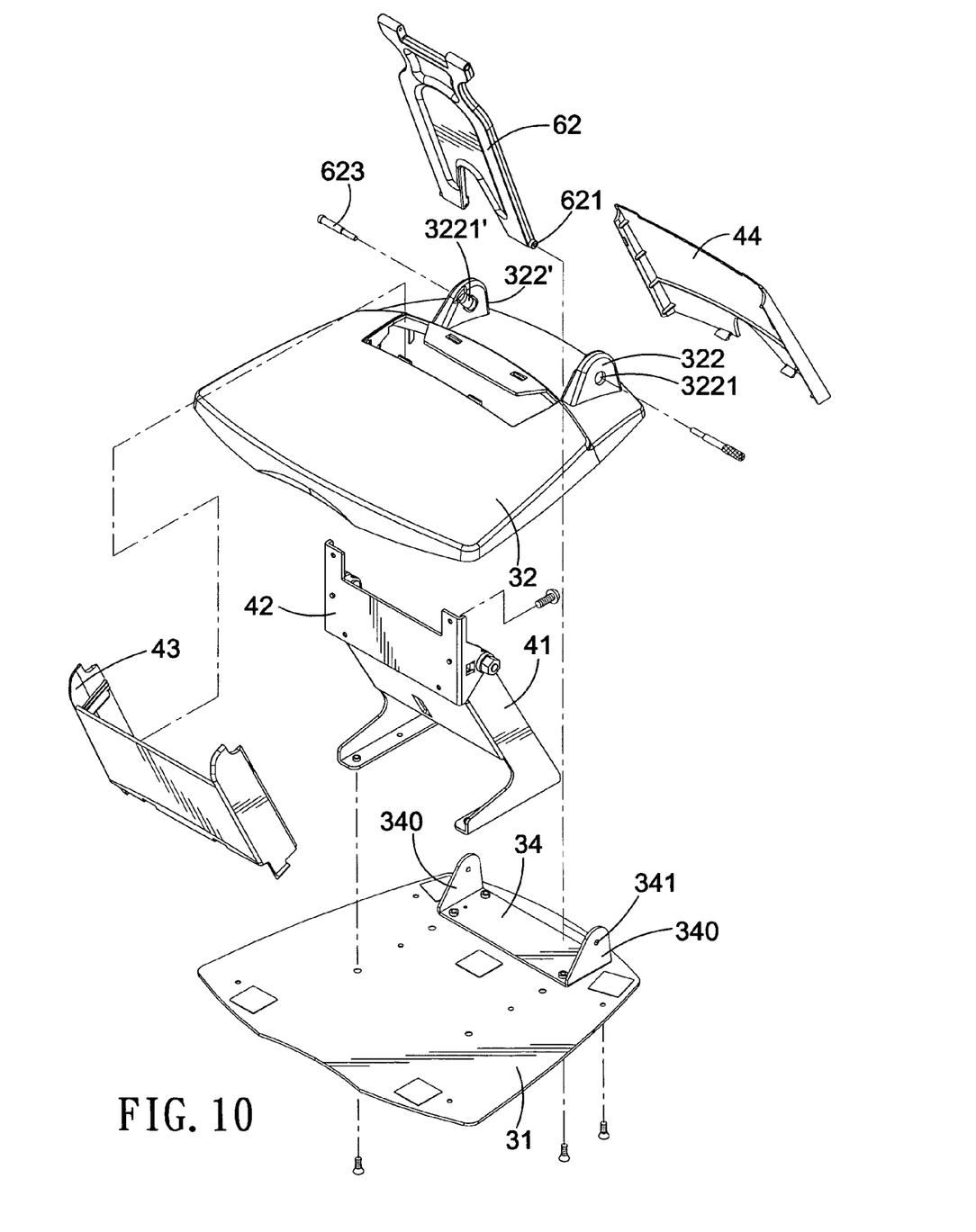
FIG. 10 is a fragmentary exploded perspective view of the second preferred embodiment of an adjustable support frame for a display screen according to this invention, illustrating a modified structure for connecting a supporting member pivotally to a frame base.
Figure 11:
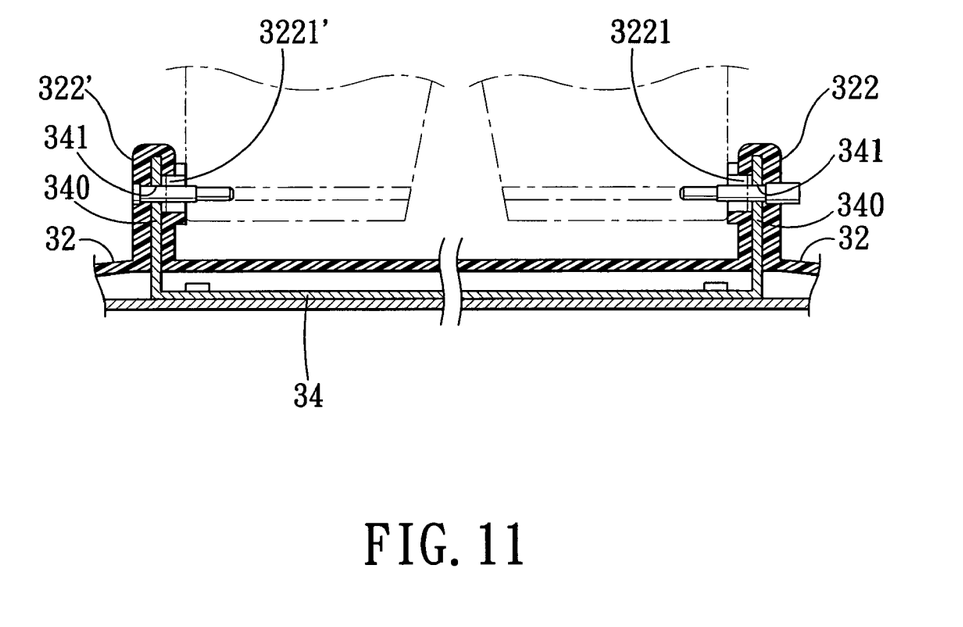
FIG. 11 is a fragmentary sectional view of a base frame of the second preferred embodiment.

FIGS. 10 and 11 show a modified structure for connecting the supporting member 62 pivotally to the frame base 3. In contrast to the previous embodiment, the first and second lugs 322, 322' are hollow, and the supporting member 62 includes a U-shaped bracket 34 fixed on the bottom plate 31. The U-shaped bracket 34 has two upright plate portions 340 that are inserted respectively into the first and second lugs 322, 322'. Each of the plate portions 340 has a threaded hole 341 that is formed therethrough and that is aligned with the pivot hole 3221 in the first lug 322 and the slot 3221' in the second lug 322'. In this embodiment, the supporting member 62 further includes two pivot bolts 623. Each of the pivot bolts 623 extends into a corresponding one of the pivot hole 3221 in the first lug 322 and the slot 3221' in the second lug 322', engages the corresponding threaded hole 341 in the U-shaped bracket 34, and is inserted into the corresponding pivot pin 621 of the supporting member 62.

The adjustable support frame 300 of this invention has the following advantages:
(1) The angle of the display screen 2 can be adjusted easily within a large range.
(2) The first and second engaging members 53, 54 engage each other along a line, rather than at one or two points.

This prevents rotation of the display screen 2 relative to the support frame 300 when a signal is inputted into the display screen 2 by use of a stylus or finger (assuming the display screen 2 is provided with touchscreen capabilities).

(3) The bottom-supporting strut unit 4 cooperates with the back-supporting strut unit 6 so as to support the display screen 2 stably on the supporting surface 400.

With this invention thus explained, it is apparent that numerous modifications and variations can be made without departing from the scope and spirit of this invention. It is therefore intended that this invention be limited only as indicated by the appended claims.

I claim:

1. An adjustable support frame for supporting a display screen on a supporting surface, the display screen having a screen back and a screen bottom, said support frame comprising:
   a frame base adapted to be disposed on the supporting surface;
   a bottom-supporting strut unit having a lower end connected fixedly to said frame base, and an upper end adapted to be connected pivotally to the screen bottom;
   a back-supporting strut unit including a connecting member and a supporting member, the supporting member having a lower end connected pivotally to said frame base, and an upper end connected pivotally to said connecting member; and
   an adjusting unit including
      a mounting plate adapted to be attached fixedly to the screen back and having a slide slot, said connecting member being movable along said slide slot,
      a first engaging member disposed fixedly on said mounting plate,
      a second engaging member disposed movably on said mounting plate,
      a driving member disposed movably on said mounting plate and movable on said mounting plate between a locking position and a release position, wherein said second engaging member engages said first engaging member to lock said connecting member on said mounting plate and angle adjustment of the display screen is prevented when said driving member is disposed at the locking position, and said second engaging member is removed from said first engaging member to release said connecting member from said mounting plate and angle adjustment of the display screen is allowed when said driving member is disposed at the release position, and
      a biasing unit for biasing said driving member to said locking position.

2. The adjustable support frame as claimed in claim 1, wherein said mounting plate has opposite front and rear side surfaces, said connecting member having a front side surface abutting against said rear side surface of said mounting plate and formed with a fixed guiding projection unit extending through said slide slot in said mounting plate, said back-supporting strut unit further including a stop member abutting against said front side surface of said mounting plate and connected fixedly to said guiding projection unit to prevent removal of said connecting member from said mounting plate while permitting movement of said connecting member on said mounting plate.

3. The adjustable support frame as claimed in claim 2, wherein said guiding projection unit includes two parallel ribs fixed on said front side surface of said connecting member and spaced apart from each other, said stop member being connected threadedly to said connecting member.

4. The adjustable support frame as claimed in claim 2, wherein said stop member is formed with a dovetail groove, said second engaging member being received slidably within said dovetail groove.

5. The adjustable support frame as claimed in claim 4, wherein each of said first and second engaging members has a serrated edge, said serrated edges of said first and second engaging members engaging each other when said driving member is disposed at said locking position.

6. The adjustable support frame as claimed in claim 1, wherein said second engaging member is movable on said mounting plate along a first direction, and said driving member is movable on said mounting plate along a second direction perpendicular to said first direction.

7. The adjustable support frame as claimed in claim 6, wherein said driving member is formed with two guiding arms projecting forwardly therefrom and aligned with each other along said second direction, said guiding arms extending in a direction inclined relative to said first and second directions, said adjusting unit further including:
   a sliding plate movable on said mounting plate along said first direction and having two guide slots extending parallel to said guiding arms, said guiding arms being movable respectively within said guide slots to move said sliding plate on said mounting plate along said first direction when said driving member moves on said mounting plate along said second direction, said second engaging member being connected to said sliding plate to allow for synchronous movement therewith; and
   a spring unit for biasing said second engaging member to engage said first engaging member.

8. The adjustable support frame as claimed in claim 7, wherein said mounting plate has opposite front and rear side surfaces, said front side surface of said mounting plate being formed with a surrounding wall along a periphery thereof, said surrounding wall having a notch, said driving member having a neck portion extending through said notch to guide said driving member to move on said mounting plate along said second direction, and an end plate connected fixedly to said neck portion and perpendicular to said mounting plate, said end plate being disposed outwardly of said mounting plate for manual operation.

9. The adjustable support frame as claimed in claim 8, wherein said sliding plate is formed with a retaining slot extending along said second direction, said second engaging member being disposed between said sliding plate and said first engaging member and having an end formed with an insert arm extending perpendicularly therefrom and inserted into said retaining slot in said sliding plate to allow for synchronous movement of said second engaging member and said sliding plate.

10. The adjustable support frame as claimed in claim 7, wherein said spring unit includes at least one compression spring for biasing said sliding plate toward said first engaging member.

11. The adjustable support frame as claimed in claim 1, wherein said biasing unit includes a tension spring interconnecting said mounting plate and said driving member.

* * * * *